2,868,792
Patented Jan. 13, 1959

2,868,792

NEW QUINUCLIDINE DERIVATIVES

Cyril A. Grob, Basel, Switzerland, assignor to Ciba Pharmaceutical Products Inc., Summit, N. J.

No Drawing. Application October 5, 1955
Serial No. 538,790

Claims priority, application Switzerland October 8, 1954

4 Claims. (Cl. 260—293)

This invention relates to quinuclidines which are substituted in 4-position by a free or functionally converted carboxyl group, their salts and quaternary compounds. As examples of a functionally converted carboxyl group there may be especially mentioned the cyano, carbamyl and the carbalkoxy groups.

These compounds are new, stable and therapeutically active. They have pronounced sympathomimetic properties which are of practical importance for a therapeutic effect on disturbed peristalsis. They are to be used as medicaments.

The new compounds are obtained when 1-alkyl-4-cyano-piperidines are converted into a metal, especially an alkali metal compound, such as a sodium or potassium compound, and this condensed with a reactive ester of a 1:2-glycol, especially with an ethylene halide, primarily ethylene chloride, and the resulting nitriles if desired converted in a manner known per se into the carboxylic acids or their functional derivatives and if desired, at any stage after the condensation with the glycol ester, the resulting compounds dequaternated and resulting bases if desired converted into their salts or quaternary compounds, or from resulting salts the free bases produced.

The metal compounds of the 1-alkyl-4-cyano-piperidines can be produced, for example, with sodium or lithium amide, potassium in liquid ammonia, lithium diethyleamide, or preferably with sodium phenyl in an inert solvent. The conversion of the nitriles into the carboxylic acids or their functional derivatives takes place in the manner known per se, for example by hydrolysis, alcoholysis, esterification, for example by conversion of a resulting carboxylic acid into the acid chloride and reaction with alcohols, preferably with lower alcohols, or by acid alcoholysis of the nitrile. Thus by treatment of the 1-alkyl-4-cyano-quinuclidinium halides with alkaline agents the corresponding betaines are obtained. The dequaternization can be carried out at any stage of the process after the condensation with the glycol ates and is effected preferably by means of pyrolysis such as dry heating under vacuum and if desired simultaneous sublimation of the resulting dequaternated compounds.

According to the method of carrying out the process, the new compounds are obtained in the form of the free bases or their salts. From the salts the bases can be produced in the customary manner; free bases can be converted by known methods into their salts. For the production of therapeutically useful salts there can be used for the preparation thereof inorganic acids, as for example hydrohalic acids, sulfuric acids, nitric acid, phosphoric acids, thiocyanic acid, or organic acids, as for example acetic acid, propionic acid, oxalic acid, malonic acid, succinic acid, malic acid, methane sulfonic acid, ethane sulfonic acid, hydroxyethane sulfonic acid, benzene or toluene sulfonic acid or therapeutically active acids. From the new bases, by treatment with quaternating agents, quaternary ammonium salts can be produced, for example by reaction with reactive esters of lower alkanols, for example alkyl halides, dialkyl sulfates or the alkyl esters of organic sulfonic acids such as those of toluene sulfonic acid.

The 1-alkyl-4-cyano-piperidines specified as starting materials can be prepared in the manner known per se.

The new compounds can be used as medicaments, for example in the form of pharmaceutical preparations which contain them or their salts in admixture with a pharmaceutical organic or inorganic carrier material suitable for enteral, parenteral or local application. For the formation of these preparations such substances are concerned as do not react with the new compounds, for example water, gelatine, lactose, starch, magnesium stearate, talc, vegetable oils, benzyl alcohols, gums, polyalkylene glycols, vaseline, cholesterol or other known medicament carriers. The pharmaceutical preparations can be made up for example, in the form of tablets, dragees, salves, creams or in liquid form as solutions, suspensions or emulsions. If desired they are sterilized and/or contain auxiliary substances such as preserving, stabilizing, wetting or emulsifying agents, salts for variation of the osmotic pressure or buffer substances. They can also contain other therapeutically valuable substances. The preparations are obtained according to known methods.

The following examples illustrate the invention:

Example 1

To a suspension of sodium phenyl prepared from 4 grams of sodium sand and 9.7 grams of chlorobenzene in 50 cc. of absolute benzene in a nitrogen atmosphere, there is added dropwise at 5° C. within 20 minutes a solution of 10 grams of 1-methyl-4-cyano-piperidine in 30 cc. of absolute benzene. After stirring for 30 minutes at 20° C. the whole is again cooled to 5° C. and with cooling 7.2 grams of 1:2-dichloroethane slowly added dropwise, stirring being then continued for 45 minutes at 20° C. In order to destroy the unused sodium, the viscous, brownish black reaction mixture is treated, with cooling, first with 3 cc. of methanol and then with 40 cc. of water. After separation of the aqueous layer this is extracted 3 times with 30 cc. of benzene each time and the combined benzene extracts dried over potassium carbonate. On heating the somewhat concentrated benzene solution to boiling under reflux for 15 hours, 2.54 grams of crystalline 1-methyl-4-cyano-quinuclidinium chloride are deposited. This extremely hydroscopic salt crystallizes from isopropanol in colorless needles of M. P. 290–293° C. (uncorrected). With ethanolic picric acid solution a picrate is obtained of M. P. 261–262° C.

After separation of the above quinuclidinium salt, the remaining benzene mother liquor leaves as residue on evaporation 4.5 grams of 1-methyl-4-cyano-piperidine, which after distillation can be used again as starting material.

The 1-methyl-4-cyano-piperidine used can be prepared in the following manner:

Isonicotinic acid amide is first reduced to isonipecotinic acid amide. For this purpose 50 grams of isonicotinic acid amide are hydrogenated in 250 cc. of dioxane with 10 grams of Raney nickel in an autoclave at 175–180° C. and at an initial pressure of about 120 atmospheres. After about 5 hours the absorption of hydrogen is complete. The still hot dioxane solution is filtered and evaporated, as a result of which there remain 45 parts by weight of isonipecotinic acid amide of M. P. 144–148° C. which can be used directly for the subsequent reductive methylation.

40 grams of this substance are dissolved in 150 cc. of methanol and treated with 27 cc. of 40% formalin solution whereby an exothermic reaction takes place. After shaking for 4 hours at room temperature, hydrogenation is carried out at ordinary pressure and temperature with about 8 grams of Raney nickel. The catalyst is then filtered off and the solution evaporated under vacuum. The colorless crystalline residue yields after recrystallization from a mixture of ethanol and ether 39 grams of 1-methyl-isonipecotinic acid amide of M. P. 196–198° C. After crystallization from acetone, the melting point is 200–201° C.

By splitting off of water, the 1-methyl-4-cyano-piperidine is obtained from this product. For this purpose 30 grams of the amide are suspended in a mixture of 120 cc. of dry benzene and 60 cc. of thionyl chloride, as a result of which a smeary mass is obtained with evolution of heat. With repeated brisk shaking the whole is boiled for 6 hours under reflux, after which time a dark brown oil separates out. After evaporation under vacuum, the residual viscous brownish black product is dissolved in the smallest possible quantity of ice water and rendered strongly alkaline to phenol phthalein with 50% potassium carbonate solution. The separated oily base is taken up in ether and the ethereal solution dried over potassium carbonate and evaporated. The remaining crude 1-methyl-4-cyano-piperidine yields on distillation under vacuum 19 grams of the pure base of boiling point 85–88° C. under 14 mm. pressure; $n_D^{25}$=1.4603. The picrate of the base crystallizes from methanol in fine yellow needles which melt at 245–247° C. with decomposition.

*Example 2*

2 grams of dry 1-methyl-4-cyano-quinuclidinium chloride are heated under a vacuum of 13 mm. of mercury to 260–270° C., whereby 4-cyano-quinuclidine condenses on the cold parts of the distillation apparatus. This is taken up in chloroform and the solution evaporated. After sublimation of the residue under 13 mm. pressure and at 110° C. bath temperature, 1.26 parts by weight of the pure base are obtained in the form of long, colorless needles of M. P. 135° C. The picrate of the base, after crystallization from methanol, melts at 286–289° C. with decomposition. With methyl iodide a methiodide is formed which crystallizes from ethanol in colorless needles and does not melt up to 310° C.

*Example 3*

1.6 grams of 1-methyl-4-cyano-quinuclidinium chloride are boiled under reflux for 5 hours with a solution of 0.4 gram of sodium hydroxide in 6 cc. of water, whereby ammonia is evolved. The reaction solution is evaporated under reduced pressure and the residue extracted with absolute ethanol. After evaporation of the ethanol extract, 1.35 grams remain of the crystalline, extremely hygroscopic N-methyl-4-quinuclidinium carboxylic acid betaine, which in the air immediately deliquesces. If the betaine is heated under 14 mm. pressure to 250–260° C., there distils the lactone of 1-methyl-4-(β-hydroxyethyl)-piperidine carboxylic acid which is produced by rearrangement of the ring structure. This substance crystallizes from pentane in the form of colorless needles of M. P. 83° C.

*Example 4*

3 grams of 4-cyano-quinuclidine are boiled under reflux for 14 hours with 50 cc. of a 5% aqueous solution of sodium hydroxide, whereby ammonia is evolved. After cooling, the whole is rendered acid with concentrated hydrochloric acid and evaporated under vacuum. By extraction of the residue with hot absolute ethanol and evaporation, 4.3 grams are obtained of quinuclidine-4-carboxylic acid hydrochloride, which crystallizes from ethanol in colorless needles. These do not melt up to 360° C.

The picrate formed from the hydrochloride with ethanolic picric acid solution forms light yellow needles of M. P. 286–289° C. with decomposition.

For the preparation of the free quinuclidine-4-carboxylic acid, 1 gram of the hydrochloride is shaken with 1.2 grams of silver oxide in 20 grams of water and the reaction solution filtered and evaporated. By crystallization of the residue from ethanol, the free amino acid is obtained in the form of colorless leaflets. These, in a melting point tube, become discolored at about 340° C. but do not melt up to 370° C. With picric acid the above described picrate of M. P. 286–289° C. (with decomposition) is obtained.

*Example 5*

0.3 gram of quinuclidine-4-carboxylic acid hydrochloride is boiled for 1½ hours under reflux with 4 cc. of thionyl chloride. After evaporation under vacuum, the crystalline residue is boiled with 10 cc. of absolute methanol and the whole again evaporated under vacuum. On recrystallization from ethanol, 0.28 gram of 4-carbomethoxy-quinuclidine hydrochloride is obtained in the form of colorless leaflets which melt at 288–292° C. with decomposition.

The free base crystallizes from pentane in the form of branched needles and melts at 48–49° C.

In an analogous manner the 4-carbethoxy-quinuclidine hydrochloride is obtained which melts at 298–299° C. with decomposition. The free base, 4-carbethoxy-quinuclidine is a colorless oil at room temperature.

What is claimed is:

1. 1-methyl-4-cyano-quinuclidinium chloride.
2. 4-cyano-quinuclidine.
3. In a process for the manufacture of a member of the group consisting of quinuclidines which contain in 4-position a substituent selected from the group consisting of a carboxy group, a carbo-lower alkoxy group, a cyano group and a carbamyl group, salts and quaternary ammonium compounds, the step which comprises reacting a sodium salt of an N-lower alkyl-4-cyano-piperidine with an ethylene halide.
4. In a process for the manufacture of a member of the group consisting of quinuclidines which contain in 4-position a substituent selected from the group consisting of a carboxy group, a carbo-lower alkoxy group, a cyano group and a carbamyl group, salts and quaternary ammonium compounds, the step which comprises reacting the sodium salt of an N-lower alkyl-4-cyano-piperidine with ethylene chloride.

References Cited in the file of this patent

Lukes et al.: Collection of Czechoslovak Chemical Communications, vol. 15, pp. 150–55 (1950), abstracted in Chem. Abst., vol. 45, col. 5693(b).

Rubtsov et al.: Doklady Akademii Nauk Soyuza Sovetskikh Sotsialisticheskikh Respublik, vol. 88, pp. 843–4 (1953), abstracted in Chem. Abst., vol. 48, col. 3975(g).

Prelog et al.: Annalen, vol. 532, pp. 83–8 (1937), abstracted in Chem. Abst., vol. 32, col. 166(2).

Prelog et al.: Annalen, vol. 545, pp. 259–62 (1940), abstracted in Chem. Abst., vol. 35, col. 457(6).